H. C. STOUFFER.
Horse-Hay Forks.
No. 138,211. Patented April 22, 1873.
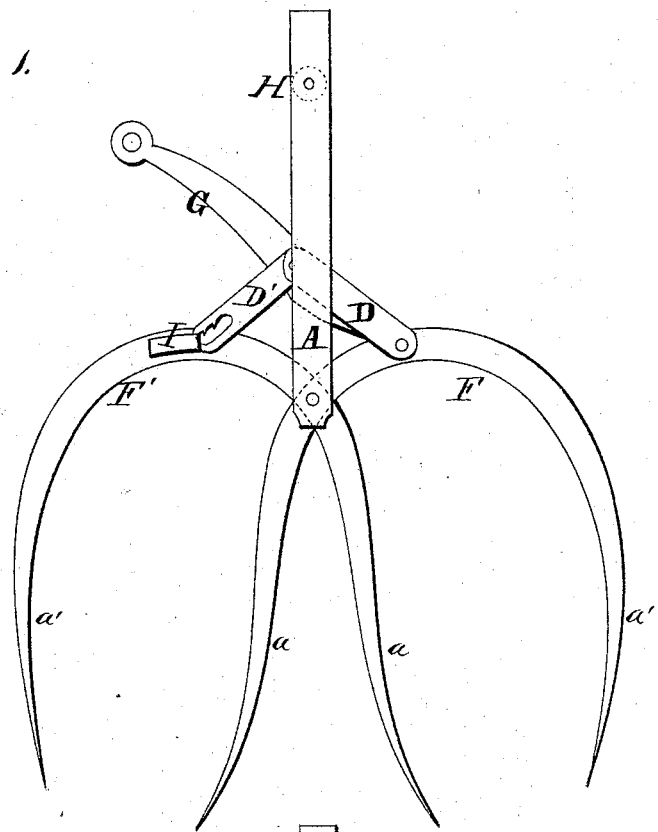
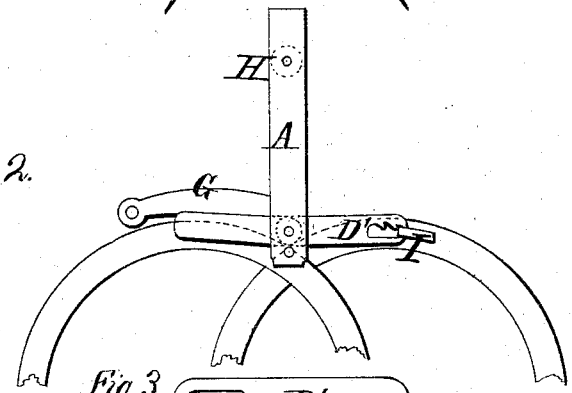
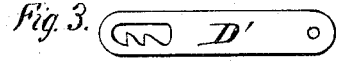

UNITED STATES PATENT OFFICE.

HIRAM C. STOUFFER, OF CANFIELD, OHIO.

IMPROVEMENT IN HORSE HAY-FORKS.

Specification forming part of Letters Patent No. 138,211, dated April 22, 1873; application filed September 21, 1872.

*To all whom it may concern:*

Be it known that I, HIRAM C. STOUFFER, of Canfield, in the county of Mahoning and State of Ohio, have invented a new and valuable Improvement in Horse Hay-Forks; and I do hereby declare that the following is a full, clear, and exact description of the construction and operation of the same, reference being had to the annexed drawing making a part of this specification and to the letters and figures of reference marked thereon.

Figure 1 of the drawing is a representation of a plan view of my invention. Fig. 2 is a detail view of the same. Fig. 3 is a partial view, showing the trip set.

This invention has relation to horse hay-forks; and consists in the construction and novel arrangement of double tines and trip mechanism, substantially as hereinafter described.

Referring to the drawing, A represents the clevis, to which is attached the rope whereby the fork is raised and lowered. To the lower end of said clevis are pivoted the jaws F F', each composed of a curved bar, constituting two tines, a a'. The outer tines are curved to a C shape, and have their points turned inward, while the inner tines approximate in curvature the form of the letter S, their points being turned outwardly. D D' indicate a pair of toggle-arms, of which D is pivoted to the jaw F. This toggle is composed of two plates, one of which is extended and forms a lever, G, to which is attached a rope passing thence over a pulley, H, pivoted between the sides of the clevis A. The arm D' is slotted at one end and connected to a loop or staple, I, attached to the jaw F'.

In working the fork, the two inner tines are brought together, and with their points overlapping and slightly separated, leaving large spaces between said points and the points of the outer tines. The tines a are then inserted in the hay, which causes them to separate and to approach the tines a', thus taking a load and automatically setting the trip by drawing down the toggles and lever. When the fork is raised its load is dropped by pulling the lever-rope, which raises the lever and brings the toggles into play. The slotted end of the toggle D' is also toothed or notched, so that it may be set at different positions.

What I claim as my invention, and desire to secure by Letters Patent, is—

The slotted-toothed toggle D', toggle D, lever G, clevis A, and double-tined jaws F F', combined and arranged substantially as specified.

In testimony that I claim the above I have hereunto subscribed my name in the presence of two witnesses.

HIRAM C. STOUFFER.

Witnesses:
   ISAAC W. KIRK,
   FRED. W. BEARDSLEY.